United States Patent [19]

Bender et al.

[11] Patent Number: 5,775,176
[45] Date of Patent: Jul. 7, 1998

[54] SEPARATORS FOR FLYWHEEL ROTORS

[75] Inventors: Donald A. Bender, Dublin; Thomas C. Kuklo, Oakdale, both of Calif.

[73] Assignee: The Regents of the University of California, Oakland, Calif.

[21] Appl. No.: 645,731

[22] Filed: May 14, 1996

[51] Int. Cl.$^6$ .................................................. G05G 1/00
[52] U.S. Cl. ................................................ 74/572; 74/573 R
[58] Field of Search ...................................... 74/572–574

[56] References Cited

U.S. PATENT DOCUMENTS

| | | | |
|---|---|---|---|
| 2,207,496 | 7/1940 | Anderson | 64/11 R |
| 2,251,804 | 8/1941 | Reuter et al. | 64/11 R |
| 2,906,572 | 9/1959 | Wroby | 308/184 R |
| 3,639,015 | 2/1972 | Maas | 308/26 |
| 4,178,041 | 12/1979 | Rush | 74/573 R |
| 4,179,951 | 12/1979 | Theyse | 74/572 |
| 4,991,462 | 2/1991 | Breslich et al. | 74/572 |

FOREIGN PATENT DOCUMENTS

| | | | |
|---|---|---|---|
| 2507734 | 9/1976 | Germany | 74/572 |
| 55-82836 | 6/1980 | Japan | 74/572 |
| 2096735 | 10/1982 | United Kingdom | 74/572 |

*Primary Examiner*—Vinh T. Luong
*Attorney, Agent, or Firm*—Henry P. Sartorio; John P. Wooldridge

[57] ABSTRACT

A separator forms a connection between the rotors of a concentric rotor assembly. This separator allows for the relatively free expansion of outer rotors away from inner rotors while providing a connection between the rotors that is strong enough to prevent disassembly. The rotor assembly includes at least two rotors referred to as inner and outer flywheel rings or rotors. This combination of inner flywheel ring, separator, and outer flywheel ring may be nested to include an arbitrary number of concentric rings. The separator may be a segmented or continuous ring that abuts the ends of the inner rotor and the inner bore of the outer rotor. It is supported against centrifugal loads by the outer rotor and is affixed to the outer rotor. The separator is allowed to slide with respect to the inner rotor. It is made of a material that has a modulus of elasticity that is lower than that of the rotors.

14 Claims, 3 Drawing Sheets

SEPARATORS FOR FLYWHEEL ROTORS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to high performance flywheel energy storage systems, and more specifically, it relates to the connection between concentric rings or rotors of such high performance flywheel energy storage systems.

2. Description of Related Art

A pressing problem in the development of high performance flywheel energy storage systems is the manner of connection between the concentric rings or rotors of the system. In order to maximize the energy stored in a single rotor, it is desirable to make the rotor thick radially. In thick rings, radial stresses become limiting. Radial stresses are reduced and best performance is achieved through the use of multiple, concentric thin rings. The problem that must be overcome with multiple thin rings is that the outer rings experience greater centrifugal forces than the inner rings. Thus the outer rings expand away from the inner rings, potentially causing the set to disassemble. The separator between the outer and inner rings must accommodate a growing gap between rings, maintain concentricity, and tolerate centrifugal accelerations over $10^6$ times the gravitational acceleration on the earth's surface. This separator should accomplish this without requiring machining of the filament wound rotor. In order to allow the use of the strongest and stiffest available materials in the flywheel rotor itself, the separator should function successfully when made from a material with strength and stiffness comparable to or less than the strength and stiffness of the flywheel rotor material.

SUMMARY OF THE INVENTION

It is an object of the present invention to provide a separator that forms a connection between the rotors of a concentric rotor assembly, wherein the separator allows for the relatively free expansion of outer rotors away from inner rotors while providing a connection between the rotors that is strong enough to prevent disassembly.

The invention is a separator that forms a connection between the rotors of a concentric rotor assembly. The rotor assembly comprises at least two rotors referred to as inner and outer flywheel rings or rotors. This combination of inner flywheel ring, separator, and outer flywheel ring may be nested to include an arbitrary number of concentric rings. The terms ring and rotor are synonymous and may be used interchangeably. The separator may be of a number of configurations and it must allow for the relatively free expansion of outer rotors away from inner rotors while providing a connection between the rotors that is strong enough to prevent disassembly. The separator avoids introducing resonances that would be excited in the operating speed range of the flywheel system. Dissipative or other mechanisms that could introduce whirl are prevented. The separators avoid applying unacceptable loads or stresses to the rotors, and do not require flywheel rotor machining.

The separator may be a segmented or continuous ring that abuts the ends of the inner rotor and the inner bore of the outer rotor. It is supported against centrifugal loads by the outer rotor and is affixed to the outer rotor. The separator is allowed to slide with respect to the inner rotor. It is made of a material that has a modulus of elasticity that is lower than that of the rotors. As an alternative to locating the separator at the ends of the inner ring, an arbitrary number of separators may be distributed along the length of the inner ring. This requires that the outer surface of the inner ring provide mating surfaces at the separators that allow the radial expansion of the separators without losing contact with them. The separators may be constructed to include features such as radially oriented grooves that assure geometric concentricity of inner and outer rings. As an alternative, the inner and outer rings may be designed to rotate about their centers of gravity which will naturally tend to co-locate. The centers of gravity will not necessarily coincide with the geometric centers.

DETAILED DESCRIPTION OF THE INVENTION

Figure 1A:
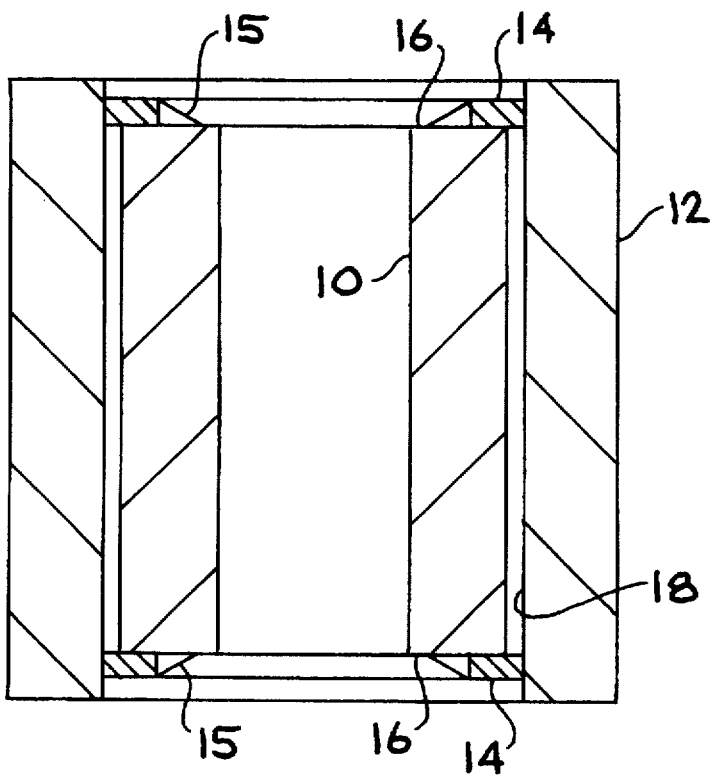
FIG. 1A shows a cross-section of a pair of concentric rotors with an embodiment of a separator.

FIG. 1A shows a cross-section of a pair of concentric rotors consisting of an inner rotor 10, outer rotor 12 and separator 14 of the present invention. The separator 14 may be a segmented or continuous ring that abuts the ends 16 of the inner rotor 10 and the inner bore 18 of the outer rotor 12. The separator 14 is supported against centrifugal loads by the outer rotor 12 and may be located or affixed to the outer rotor 12 using preload, adhesives, mechanical features such as grooves or threads, or other means. In all of the embodiments of the present invention, the separator is connected to the outer rotor, it is allowed to slide with respect to the inner rotor and it is made of a material that has a modulus of elasticity that is lower than that of the rotors.

In FIG. 1A, the separator is allowed to slide with respect to the inner rotor 10. A firm connection between the separator 14 and the outer rotor 12 is maintained through the means of attachment described above and the centrifugal forces causing the separator 14 to expand against the outer rotor 12. A connection between the separator 14 and the inner rotor 10 is achieved through any combination of the following means: the precision of the initial assembly, an overturning moment, due to centrifugal force that causes the separator 14 to rotate in such a way as to lock against the inner rotor 10, or elastic or plastic deformation due to centrifugal force that causes the separator 14 to lock against the inner rotor. Additionally, a connection to both inner rotor 10 and outer rotor 12 may be achieved simultaneously through the use of a spring 15 between the inner rotor 10 and the separator 14 that holds the separator 14 against the outer rotor 12. This feature could be employed when the assembly is at rest with other forms of connection taking over at operating speed.

Figure 1B:
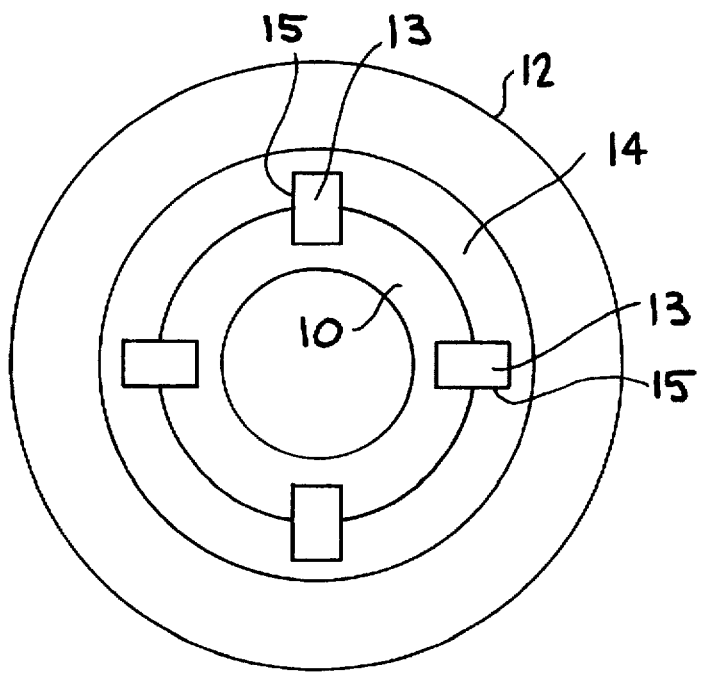
FIG. 1B shows a top view of the embodiment of FIG. 1A using expansion guides with an integral separator.
Figure 1C:
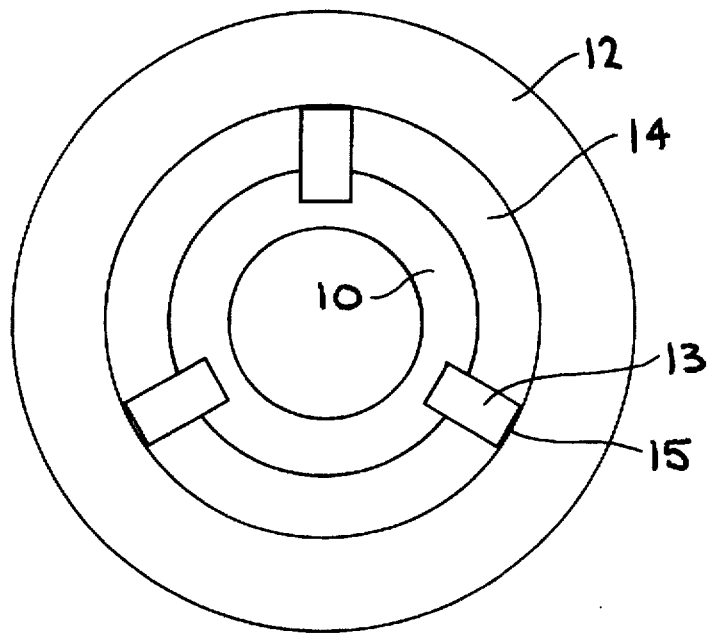
FIG. 1C shows a top view of the embodiment of FIG. 1A using expansion guides with a segmented separator.

FIG. 1B shows a top view of the embodiment of FIG. 1A using expansion guides with an integral separator. In the figure, rotor 10 has 4 separator guides 13 which mate with guided portion 15 of separator 14. The separator guides 13 may comprise a portion that is raised with respect to the rotor 10. All of the separators of the present invention have a guided portion that mates with separator guides or grooves. The number of guides required depends of the separator configuration. FIG. 1C shows a rotor 10 with raised separator guides 13. Segmented separator 14, abutting outer rotor 12, is configured so that the space between the segments acts as the guided portion 15. When the separator 14 is a continuous ring (FIG. 1B), at least 2 guides spaced 90 degrees apart are required. When the separator is segmented, as shown in FIG. 1C, at least three guides are required. In all embodiments, the guide must extend away from the center of rotation of the rotors.

Figure 2:
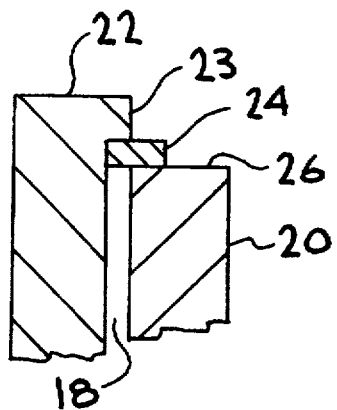
FIG. 2 shows a captured separator.
Figure 3:
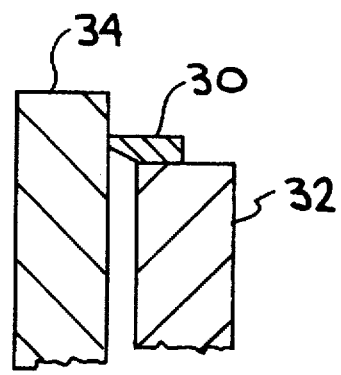
FIG. 3 shows a centrifugal self locking separator.
Figure 4:
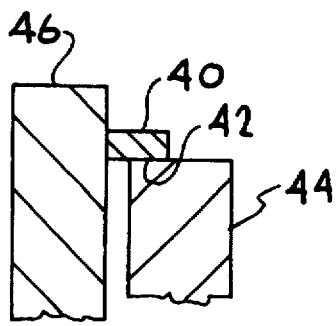
FIG. 4 shows a radial groove separator.
Figure 5:
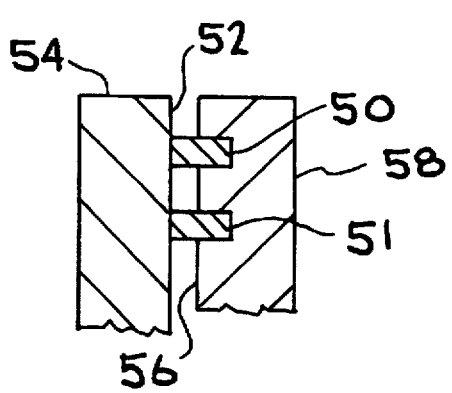
FIG. 5 shows a axially distributed separator.

FIG. 2 shows a cross-section of a pair of concentric rotors consisting of an inner rotor 20 and an outer rotor 22. Outer rotor 22 comprises a shelf portion 23. Separator 24 of the present invention abuts the ends 26 of the inner rotor 20 and the inner bore 28 of the outer rotor 22. FIG. 3 shows a separator that is self locking. Separator 30 may be a continuous or segmented ring having a triangular cross-section. Due to its tapered ends, separator 30 will wedge and lock the relative positions of inner rotor 32 and outer rotor 34 upon sufficient centrifugal force caused by the high angular velocities attained by the rotors. Separator 30 is attached only to outer rotor 34. As the centrifugal force increases, outer rotor 34 expands away from inner rotor 32. Separator 30 then exerts a force into inner rotor 32, thus providing a resisting force against the centrifugal force acting on outer rotor 34. In FIG. 4, separator 40 fits into a radial groove 42 on inner rotor 44. This configuration serves to lock the relative positions of inner rotor 44 to outer rotor 46. FIG. 5 shows two separators 50 and 51 affixed to the inner bore 52 of outer rotor 54 and positioned to fit into grooves located in the outer bore 56 of inner rotor 58. Depending on space limitations, any number of separators can be used between the rotors.

Figure 6:
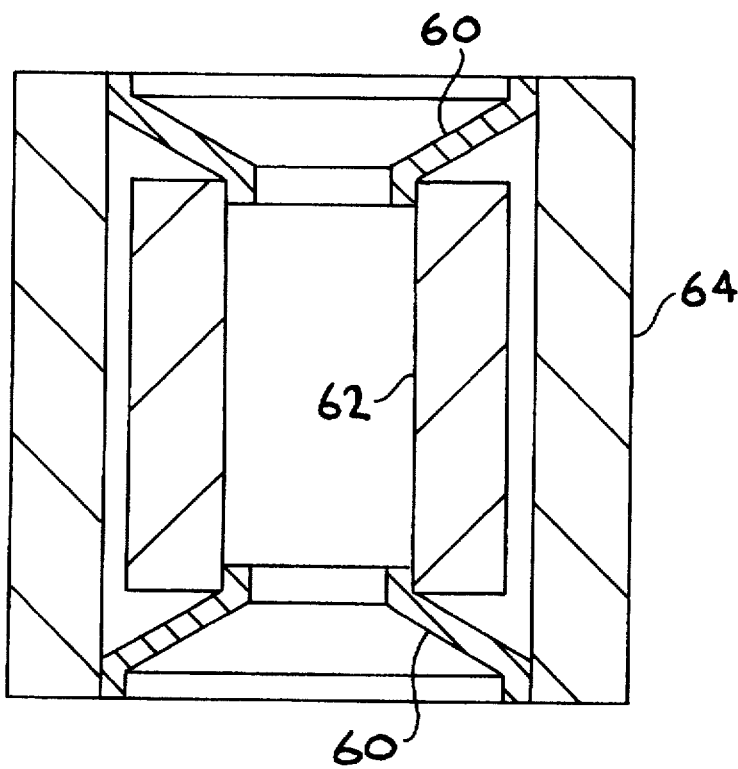
FIG. 6 shows a cross-section of a pair of concentric rotors with another embodiment of a separator.

Referring to FIG. 6, the separator 60 may be a single part or a segmented assembly that abuts the interior surfaces of the two concentric flywheel rotors comprising inner rotor 62 and outer rotor 64. For flywheel rotors having filament winding, the interior surfaces of these rotors are inherently circular and smooth and do not require machining. The exterior surfaces of filament wound rotors are generally rough and would require machining in order to mate to other parts. Thus, by mating to the inner surfaces of the flywheel rotors, machining of the flywheel rotors is avoided. The separator is supported against centrifugal loads by both the inner and outer flywheel rotors and may be located or affixed to the flywheel rotors using a variety of means including: preload, adhesives, mechanical features such as grooves or threads, or other means. The separator is always attached to the outer rotor only. Since the flywheel rotors are used to support the separator, the separator may have a somewhat lower strength and stiffness than the flywheel rotors. The modulus of elasticity of the separator is chosen to be less than that of the rotors to allow the separator to expand.

In the representative embodiment of FIG. 6, the separator 60 comprises a portion affixed at each end of the pair of flywheel rings. These portions are secured to the outer rotor 64. The separator 60 is made from a material with slightly less strength and stiffness than the flywheel rotors. One rim of the separator 60 is supported against the inner rotor 64, and another rim of the separator 60 is supported by and connected to the outer rotor 64, and the central portion of the separator 60 has sufficient strength and flexibility to permit radial growth while withstanding whatever portion of the centrifugal load that is not borne by the flywheel rotors.

Figure 7:
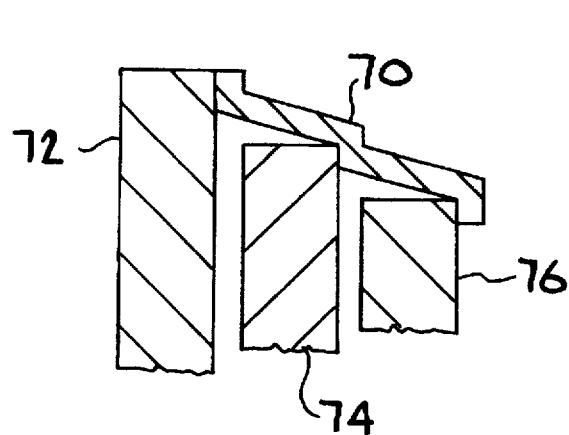
FIG. 7 shows a high stiffness separator used with multiple rotors.
Figure 8:
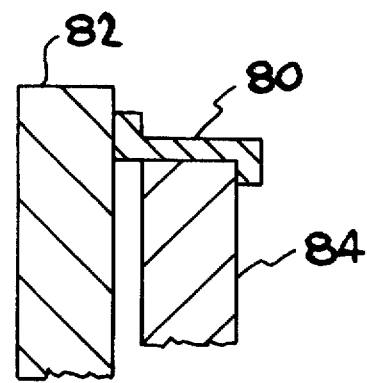
FIG. 8 shows a disc cross-section high stiffness separator.

FIG. 7 shows a separator 70 with a portion affixed to an outer rotor 72. Separator 70 expands against a central rotor 74 and an inner rotor 76. FIG. 8 shows a disc cross-section separator 80 having an outer portion attached to outer rotor 82 and an inner portion for expansion against an inner rotor 84.

The separator may have a variety of shapes including: disc, cone (tapered axially outward or inward), and drum (thick disc). The ends may be plain or flanged. Attachment to the flywheel rings may be mechanical, using adhesives, or through shrink or other compression fit.

The present invention may be used in any rotating machinery although it will be of greatest use in high speed rotating machinery where gradients in centrifugal force are significant. These uses include: flywheel systems, gas turbine engines, cryogenic pumps such as those used in liquid fuel rocket engines, any rotating machinery in vacuum or high cleanliness environments, and many types of instrumentation such as gyroscopes.

Changes and modifications in the specifically described embodiments can be carried out without departing from the scope of the invention, which is intended to be limited by the scope of the appended claims.

We claim:

1. In a concentric ring rotor assembly comprising an inner rotor that rotates within the inner bore of an outer rotor, the improvement comprising:

at least one separator operatively connected between at least two concentric rings of said concentric ring rotor assembly, wherein said at least one separator allows for radial growth between said at least two concentric rings while providing a connection between said at least two concentric rings that is strong enough to prevent said concentric ring rotor assembly from disassembling.

2. In a concentric rotor assembly comprising at least two concentric rotors comprising an inner rotor that rotates within the inner bore of an outer rotor, the improvement comprising:

at least one separator operatively connected between said at least two concentric rotors of said concentric rotor assembly, wherein said at least one separator is fixedly connected to said outer rotor of said at least two concentric rotors, and comprises a material having a modulus of elasticity that is less than that of the rotors of said concentric rotor assembly, wherein said separator may slide with respect to said inner rotor of said concentric rotor assembly when said assembly rotates and wherein said at least one separator allows for controlled radial growth between said at least two concentric rotors when said assembly rotates.

3. The improvement of claim 2, wherein said at least one separator comprises at least one continuous ring.

4. The improvement of claim 2, wherein said at least one separator comprises at least one segment of a continuous ring.

5. The improvement of claim 2, further comprising a spring connected between said inner rotor and said separator.

6. The improvement of claim 2, wherein said inner rotor comprises at least two expansion guides, wherein each expansion guide extends from the center of rotation of said concentric rotor assembly, and wherein said at least one separator comprises portions configured to slide within said at least two expansion guides.

7. The improvement of claim 6, wherein said at least one separator comprises a continuous ring.

8. The improvement of claim 6, wherein said at least one separator comprises at least one segment of a continuous ring, wherein said inner rotor comprises at least three expansion guides.

9. The improvement of claim 2, wherein said outer rotor comprises a shelf portion for capturing said at least one separator.

10. The improvement of claim 2, wherein said at least one separator comprises a continuous ring having a triangular cross-section, wherein, as centrifugal force is increased, said at least one separator exerts a force into said inner rotor, thus providing a resisting force against the centrifugal force acting on said outer rotor.

11. The improvement of claim 2, wherein said at least one separator comprises at least one segment of a continuous ring having a triangular cross-section, wherein, as centrifugal force is increased, said at least one separator exerts a force into said inner rotor, thus providing a resisting force against the centrifugal force acting on said outer rotor.

12. The improvement of claim 2, wherein said inner rotor comprises a radial groove, wherein said separator fits within said radial groove.

13. The improvement of claim 2, wherein said inner rotor comprises a plurality of grooves located in its outer bore, wherein said at least one separator fits within said plurality of grooves.

14. The improvement of claim 2,
- wherein said concentric rotor assembly comprises at least three concentric rotors comprising a central rotor,
- wherein said at least one separator is operatively connected between said at least three concentric rotors of said concentric rotor assembly, and
- wherein said separator may slide with respect to said central rotor and said inner rotor of said concentric rotor assembly when said assembly rotates.

\* \* \* \* \*